(12) United States Patent
Rosenboom

(10) Patent No.: US 10,506,753 B1
(45) Date of Patent: Dec. 17, 2019

(54) STRIP FRESHENER

(71) Applicant: Lyn A. Rosenboom, Clifton, IL (US)

(72) Inventor: Lyn A. Rosenboom, Clifton, IL (US)

( * ) Notice: Subject to any disclaimer, the term of this patent is extended or adjusted under 35 U.S.C. 154(b) by 71 days.

(21) Appl. No.: 15/950,765

(22) Filed: Apr. 11, 2018

Related U.S. Application Data

(60) Provisional application No. 62/488,903, filed on Apr. 24, 2017.

(51) Int. Cl.
*A01B 21/04* (2006.01)
*A01B 5/06* (2006.01)
*A01B 63/00* (2006.01)
*A01B 59/06* (2006.01)
*A01B 39/14* (2006.01)

(52) U.S. Cl.
CPC .............. *A01B 5/06* (2013.01); *A01B 21/04* (2013.01); *A01B 39/14* (2013.01); *A01B 59/065* (2013.01); *A01B 63/008* (2013.01)

(58) Field of Classification Search
CPC .... A01B 5/00; A01B 5/04; A01B 5/06; A01B 5/02; A01B 21/00; A01B 21/04; A01B 21/08; A01B 21/086; A01B 17/004; A01B 39/14

See application file for complete search history.

(56) References Cited

U.S. PATENT DOCUMENTS

| | | | | |
|---|---|---|---|---|
| 2,319,899 A | * | 5/1943 | Silver | A01B 13/16 172/134 |
| 3,923,103 A | * | 12/1975 | Davis | A01B 39/26 172/201 |
| 4,396,070 A | * | 8/1983 | Brandner | A01B 61/046 172/572 |
| 4,425,972 A | * | 1/1984 | Steinberg | A01B 61/046 172/551 |
| 5,190,112 A | * | 3/1993 | Johnston | A01B 21/04 172/245 |
| 5,279,236 A | * | 1/1994 | Truax | A01B 21/086 111/139 |
| 5,333,694 A | | 8/1994 | Roggenbuck et al. | |
| 5,419,402 A | * | 5/1995 | Heintzman | A01B 21/04 172/520 |
| 5,520,125 A | | 5/1996 | Thompson et al. | |
| 6,761,120 B2 | | 7/2004 | Kovach et al. | |
| 7,213,523 B2 | | 5/2007 | Neudorf et al. | |
| 7,866,270 B2 | | 1/2011 | Ankenman | |
| 9,267,255 B2 | * | 2/2016 | Claussen | E02B 11/02 |
| 9,345,187 B2 | * | 5/2016 | Laake, Jr. | A01B 5/04 |
| 9,674,996 B2 | * | 6/2017 | Claussen | E02F 3/20 |
| 9,736,974 B2 | * | 8/2017 | Hurd | A01B 35/16 |
| 9,775,274 B2 | * | 10/2017 | Steinlage | A01B 15/16 |
| 10,362,721 B2 | * | 7/2019 | Hurd | A01B 35/16 |
| 2007/0175644 A1 | * | 8/2007 | Skolness | A01B 35/16 172/540 |
| 2013/0192855 A1 | * | 8/2013 | Meek | A01B 27/005 172/146 |
| 2016/0106022 A1 | * | 4/2016 | Adams | A01C 7/203 172/4 |
| 2016/0360690 A1 | * | 12/2016 | Jia | A01B 15/16 |
| 2018/0235138 A1 | * | 8/2018 | Bulizuik | A01B 21/086 |

* cited by examiner

*Primary Examiner* — Matthew Troutman
(74) *Attorney, Agent, or Firm* — Philip L. Bateman

(57) ABSTRACT

A strip freshener row implement lightly tills a strip of ground before planting. The implement has two pairs of freely rotating spike wheels that break up clods of dirt and break the top surface of the soil.

10 Claims, 10 Drawing Sheets

STRIP FRESHENER

CROSS-REFERENCE TO RELATED APPLICATION

This application claims the benefit of U.S. Provisional Application Ser. No. 62/488,903, Apr. 24, 2017.

FIELD OF THE INVENTION

This invention relates to farming. More particularly, this invention relates to row implements for the tillage, planting, and fertilization of farmland.

BACKGROUND OF THE INVENTION

It is well known that crops such as corn and soybeans grow best in soil that is loose, rich in nutrients, and free of debris. After a crop is harvested, the soil is often compacted, depleted of nutrients, and full of crop residue and other debris. To restore the soil to optimal conditions, the soil is often tilled immediately before planting. Tilling is also known as cultivating or plowing (also spelled "ploughing"). The soil may also be tilled immediately after harvest. The conventional method of tillage is to treat the entire field. More recently, it has become popular to treat only the narrow strips of soil that will contain the seed rows simultaneously as the seeds are planted. This method of tillage is commonly known as strip tillage or zone tillage. Strip tillage saves time and energy and reduces erosion.

Strip tillage is performed by driving a tractor through the field pulling a wheeled toolbar to which many multiple-function row implements are attached. The row implements are spaced apart to correspond to the seed rows that will be planted. A conventional multiple-function row implement contains a frame with a bracket for attachment to a toolbar. Attached to the frame are cleaning disks to clear crop residue and other debris, scoring disks (also known as colters or coulters) to break the surface of the ground, a knife attached to a shank to create a trench (also known as a furrow) in the soil into which the seeds are deposited if planting is being conducted, and closing disks to fill in the trench to create a raised berm where the trench had been formed. Many multiple-function row implements also contain one or more tamping wheels at the rear that tamp the berm to the desired density and cross section.

A variety of multiple-function row implements have been disclosed. For example, multiple-function row implements are disclosed in Roggenbuck et al., U.S. Pat. No. 5,333,694, Aug. 2, 1994; Thompson et al., U.S. Pat. No. 5,520,125, May 28, 1996; Kovach et al., U.S. Pat. No. 6,761,120, Jul. 13, 2004; Neudorf et al., U.S. Pat. No. 7,213,523, May 8, 2007; and Ankenman, U.S. Pat. No. 7,866,270, Jan. 11, 2011. While these multiple-function row implements can clean, break the ground, create a trench, plant seeds, and fill the trench, results are not always ideal. In particular, the use of these implements on hard ground containing large lumps of dirt from the winter can result in excessive amounts of dirt being moved from the row. Accordingly, there is a demand for an implement that lightly tills ("freshens") the strip of ground prior to the use of these multiple-function row implements.

SUMMARY OF THE INVENTION

The general object of this invention is to provide an improved strip freshener row implement. A more particular object is to provide a strip freshener row implement that lightly tills a strip of ground.

I have invented an improved strip freshener row implement tilling a row in soil. The implement comprises: (a) a toolbar bracket for attachment to a toolbar pulled by a tractor; (b) a frame having a forward proximate end and a rearward distal end, the frame extending rearwardly from its forward proximate end and forming a longitudinal axis overlying the row, the frame being pivotably connected at its forward proximate end to the toolbar bracket; (c) a shock absorber contacting the toolbar bracket and the frame to exert a downward force on the frame and to absorb upward movement of the frame; (d) a horizontal bracket transverse to the longitudinal axis of the frame connected to the rearward distal end of the frame; (e) two descending outward arms having upper proximate ends and lower distal ends, the outward arms connected at their upper proximate ends to the horizontal bracket and having spindles at their lower distal ends; (f) a depth wheel freely rotating on each of the spindles of the outward arms; (g) two descending inward arms having upper proximate ends and lower distal ends, the inward arms connected at their upper proximate ends to the horizontal bracket and having an outwardly facing spindle and an inwardly facing spindle at their lower distal ends; and (h) a spiked disk freely rotating on each spindle of each inward arm The row implement of this invention lightly tills a strip of ground and ensures better results when the strip of ground is subsequently treated with a multiple-function row implement.

DETAILED DESCRIPTION OF THE INVENTION

Figure 1:
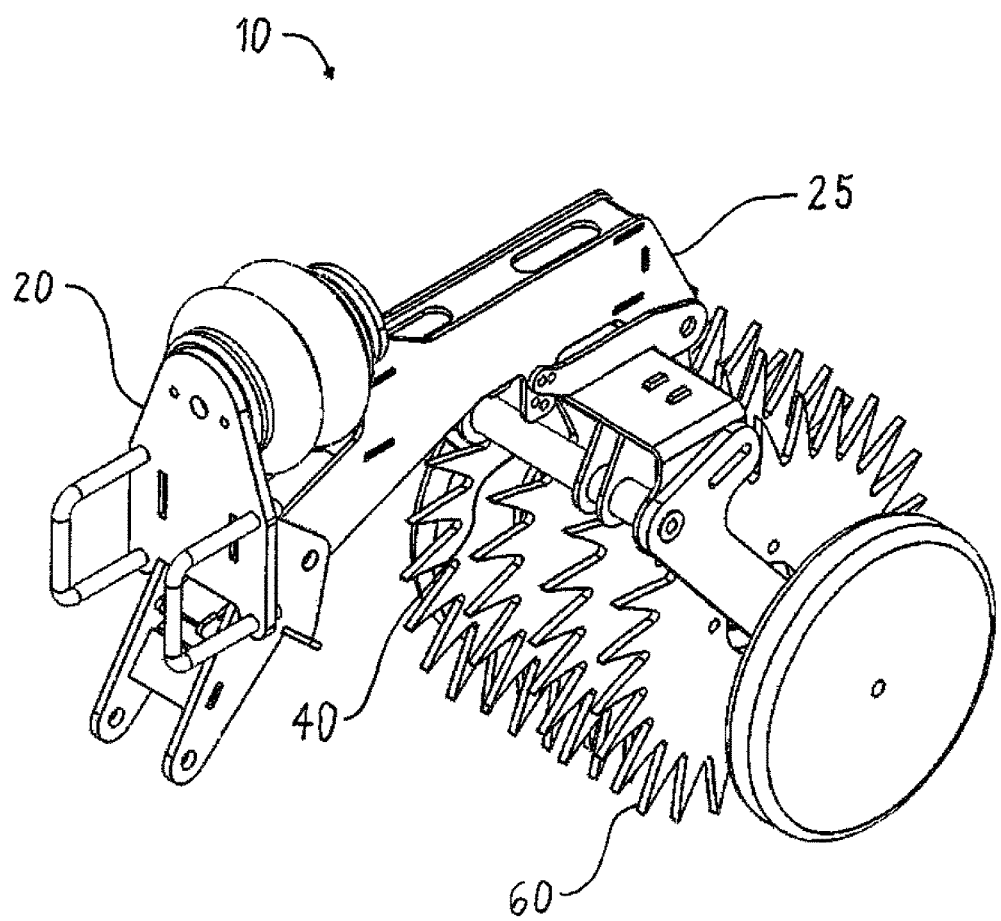
FIG. 1 is a front and top perspective view of a first embodiment of the row implement of this invention.
Figure 2:
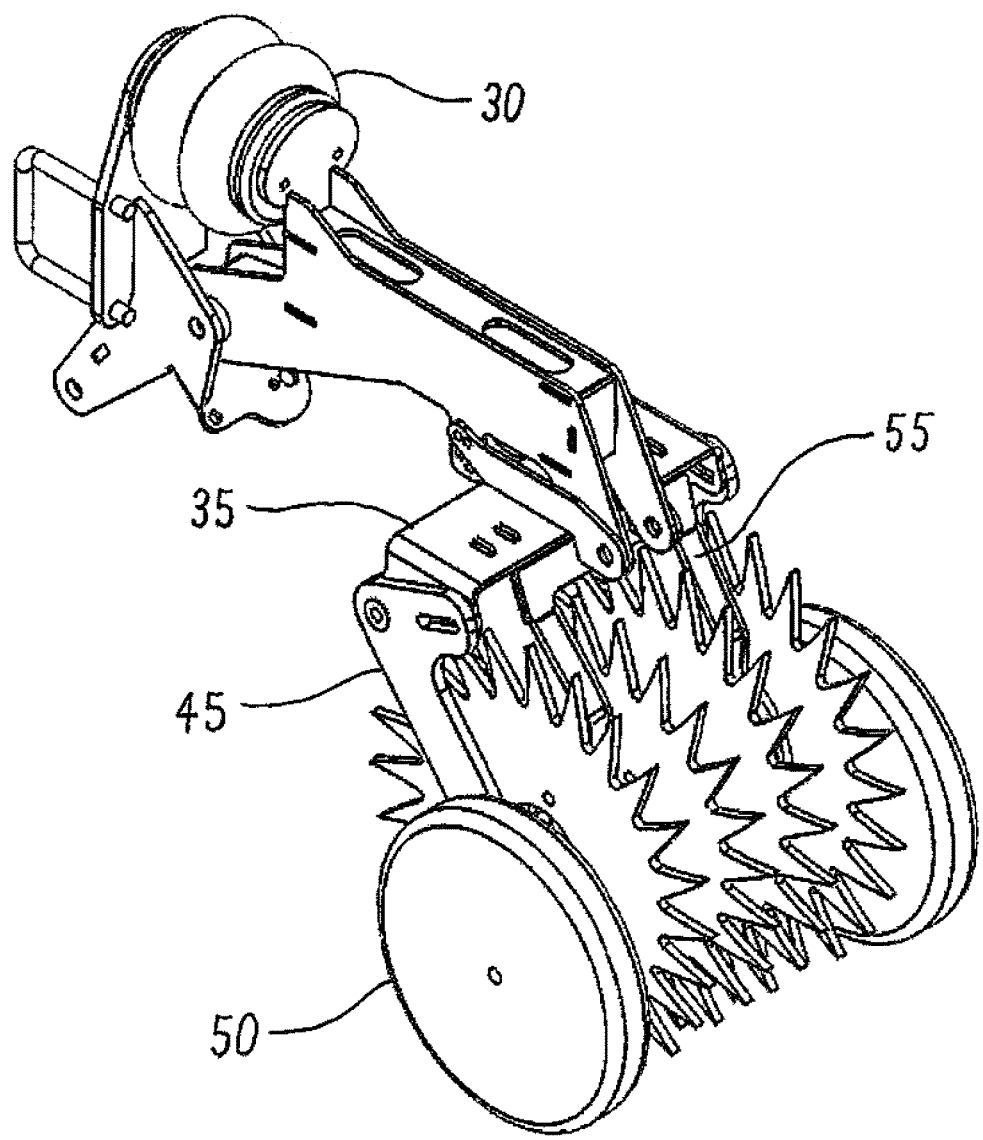
FIG. 2 is a rear and top perspective view thereof.

This invention is best understood by reference to the drawings. Referring first to FIGS. 1 and 2, a first embodiment of the strip freshener row implement 10 of this invention comprises a toolbar bracket 20, a frame 25, a shock absorber 30, a transverse bracket 35, a connecting rod 40, two outward arms 45, two depth wheels 50, two inward arms 55, and four spike wheels 60. The row implement is commonly known as a strip freshener because it freshens (lightly tills) a strip of ground. The terms "transverse" and "longitudinal" as used herein refer to the orientation of an item relative to the direction of travel of the implement and the direction of the row. Unless otherwise indicated expressly or by context, the term "about" is used herein to mean plus or minus 25 percent of the measurement or other quantified property referenced. The components are discussed in more detail below.

The toolbar bracket 20 attaches the strip freshener row implement to a toolbar. Toolbars for attaching and pulling equipment through fields are standard items in modern farming. Toolbars typically contain transverse square bars from which various pieces of equipment are attached. The toolbar bracket includes a transverse vertical plate 21 and two U-bolt fasteners 22. The toolbar bracket is attached to the toolbar by placing the U-bolts over the toolbar and then fastening them to the vertical plate. The toolbar bracket also contains two parallel vertical plates 23 with holes for a pivoting connection of the frame as described below.

The frame 25 is pivotably connected at its forward proximate end to the parallel vertical plates of the toolbar bracket. The frame extends rearwardly and longitudinally so it is directly over the strip of land being freshened. The frame of the first embodiment is generally horizontal. The pivoting connection 26 allows the frame to pivot up and down about a transverse axis. In the first embodiment, the frame is made of steel plate and has an overall length of about two feet.

The shock absorber 30 is disposed between the transverse vertical plate of the toolbar bracket and the forward proximate end of the frame. In the first embodiment, the shock absorber is an airbag. A variety of shock absorbers are known and are also suitable, including coil springs, pneumatic cylinders, hydraulic cylinders, and the like. The shock absorber serves two purposes. First, it exerts a force upon the frame that causes the frame to pivot downwardly to make good contact with the ground. Second, it absorbs and dampens upward movement as the implement travels over the ground.

The transverse bracket 35 is connected to the rearward distal end of the frame. The transverse bracket descends from the frame. It includes a transverse horizontal plate 36 that is welded or otherwise connected to the frame, and multiple longitudinal vertical plates that contain coaxial holes to accommodate a non-rotating horizontal transverse connecting rod 40. While the transverse bracket is generally a separate part, it can also be incorporated as part of the main frame form an integral structure if desired. The connecting rod supports the two outward arms with their depth wheels and the two inward arms with their pairs of spike wheels. The connecting rod is omitted if desired. If omitted, the outward and inward arms are connected directly to the transverse bracket.

Figure 3:
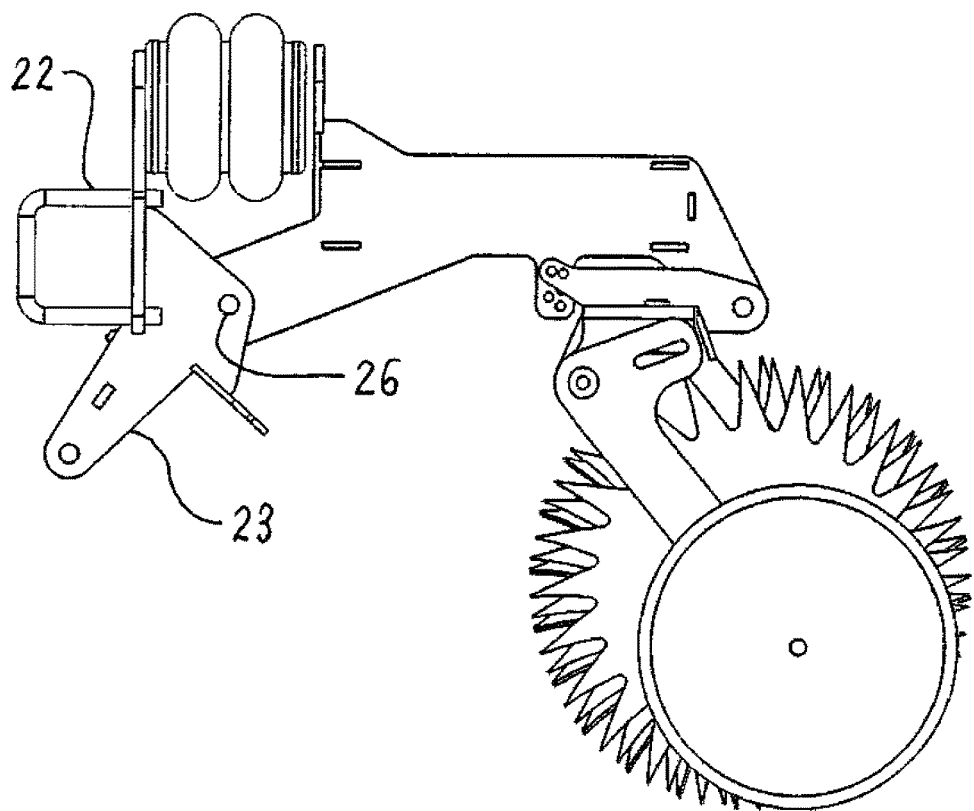
FIG. 3 is a side elevation view thereof.

The two outward arms 45 are connected at their upper proximate ends to the outside ends of the connecting rod in the first embodiment. The trailing angle of the arms relative to the connecting rod is best seen in FIG. 3 and is preferably adjustable. In the first embodiment, the adjustability is provided by slots in the upper part of the arms that overlap slots in the shaft bracket. Once the desired angle is set, the arms are fixed in position with nuts, bolts, or other fasteners. The adjustability of the outward arms enables the position of the spike wheels relative to the depth wheels to be adjusted. This, in turn, enables the depth to which the spike wheels enter the ground to be adjusted. In the first embodiment, the arms are formed of elongated longitudinal plates. An outwardly facing, freely rotating, spindle 46 is at the lower distal end of each outward arm. A depth wheel 50 is attached to each spindle. Depth wheels are conventional and are typically made of metal or a combination of rubber tire on a metal wheel.

The two inward arms 55 are connected at their upper proximate ends to the connecting rod, inside of the connections of the outward arms. The inward arms are fixed in position relative to the connecting rod. In the preferred embodiment, the arms are formed of elongated longitudinal plates. An outwardly facing, freely rotating, spindle and an inwardly facing, freely rotating, spindle are at the lower distal end of each inward arm. The two spindles on each inward arm are independent of each other or are connected by a common axle within a housing so they rotate freely together. Independent spindles require two bearings whereas a common axle requires only one bearing. However, independent spindles provide slightly superior functioning. The inward arms are preferably angled rather than perfectly vertical, as described in more detail below. While two inward arms are preferred, one of the inward arms is omitted if desired.

A spike wheel 60 is attached to each inward arm spindle. In other words, each inward arm contains two spike wheels. The spike wheels generally have a diameter of about two feet and have about twenty to forty spikes. Each spike generally has a length of about three to five inches. The shape of the spikes is a matter of choice. The configuration of the spike wheels is also a matter of choice that depends on durability desired and soil conditions. The spike wheels are preferably made of hardened steel.

Figure 4:
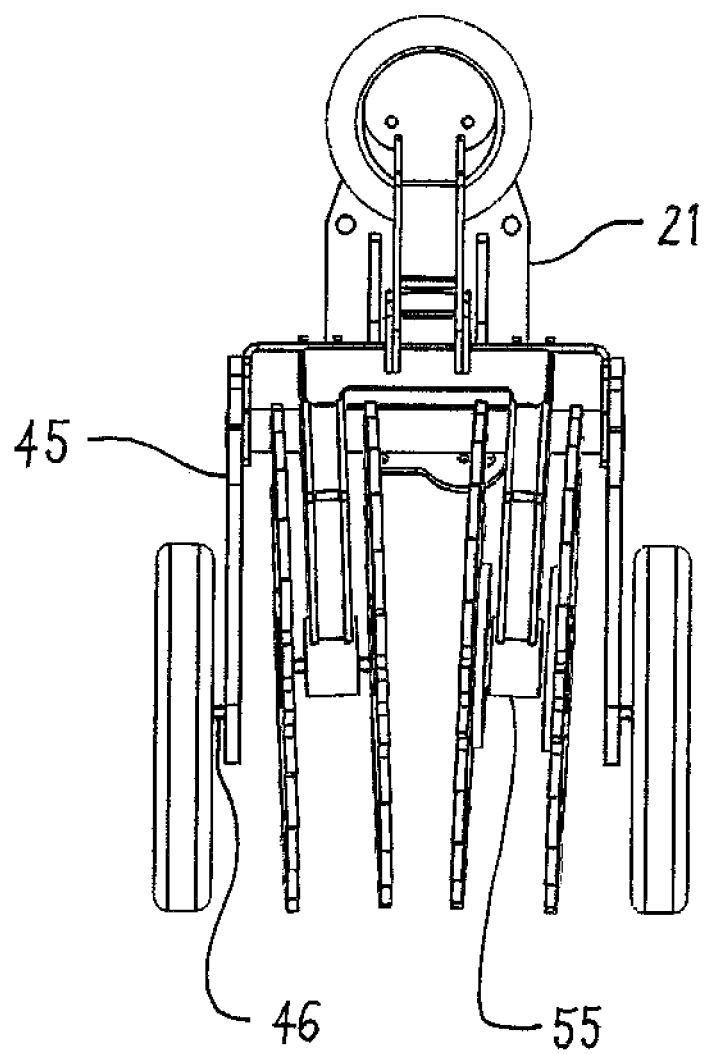
FIG. 4 is a rear elevation view thereof.
Figure 5:
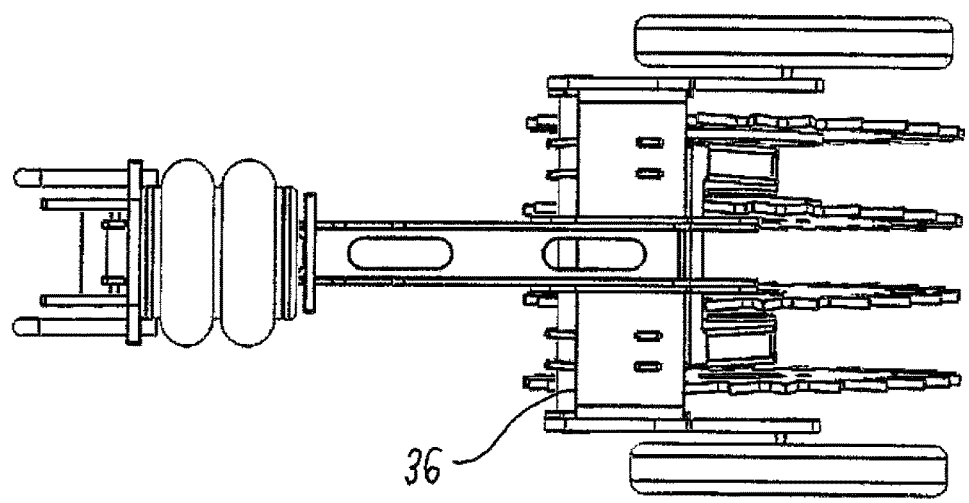
FIG. 5 is a top plan view thereof.
Figure 6:
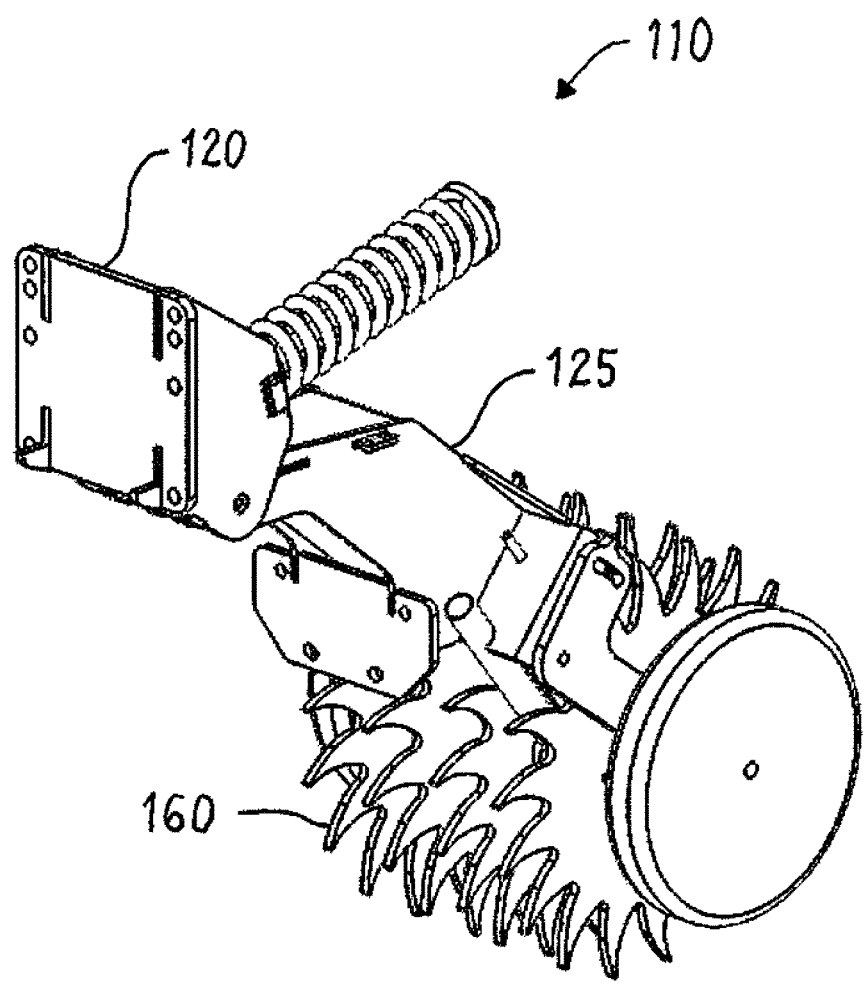
FIG. 6 is a front and top perspective view of a second embodiment of the row implement of this invention.
Figure 7:
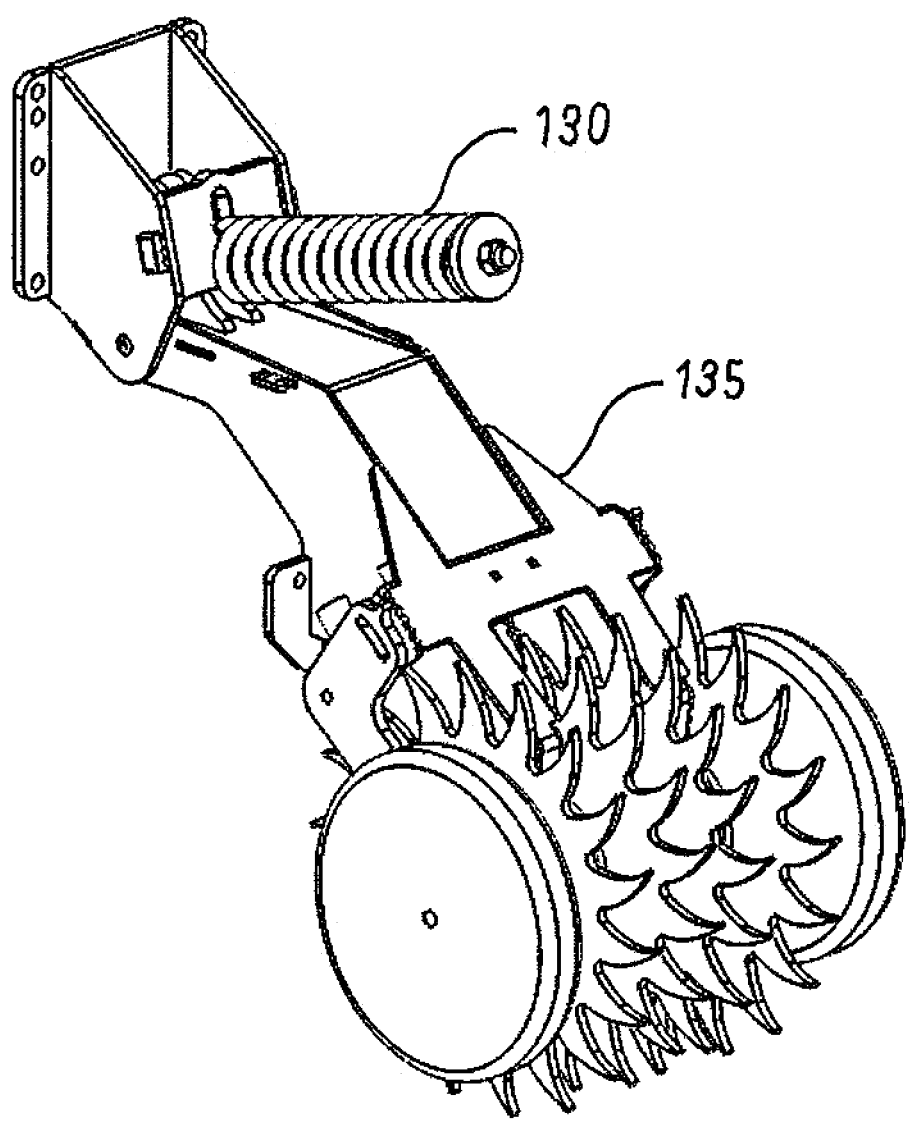
FIG. 7 is a rear and top perspective view thereof.
Figure 8:
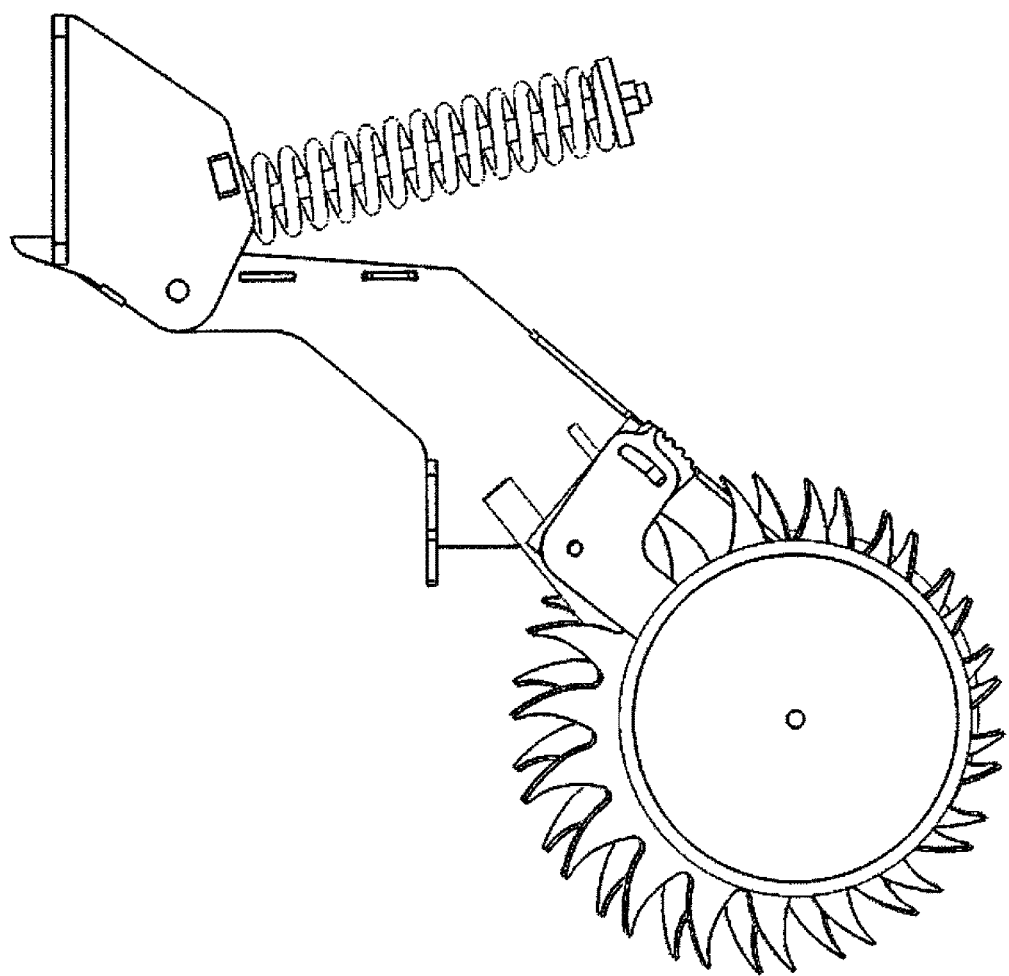
FIG. 8 is a side elevation view thereof.

Using the nomenclature of vehicle wheels and suspension systems, each pair of spike wheels preferably has a positive camber and a negative toe. The positive camber and the negative optimally direct dirt to the center of the strip being freshened. The positive camber and the negative toe are preferably each about two to fifteen degrees. The positive camber and the negative toe are best seen in FIGS. 4 and 5.

A second embodiment of the strip freshener row implement 110 is shown in FIGS. 6 to 10. The second embodiment is similar to the first embodiment with the following exceptions. First, the bracket 120 of the second embodiment is suited for attachment to a flat surface whereas the bracket of the first embodiment is suited for attachment to a bar. Second, the frame 125 of the second embodiment is angled downwardly whereas the frame of the first embodiment is more horizontal, as best seen by comparing FIGS. 3 and 8.

Figure 10:
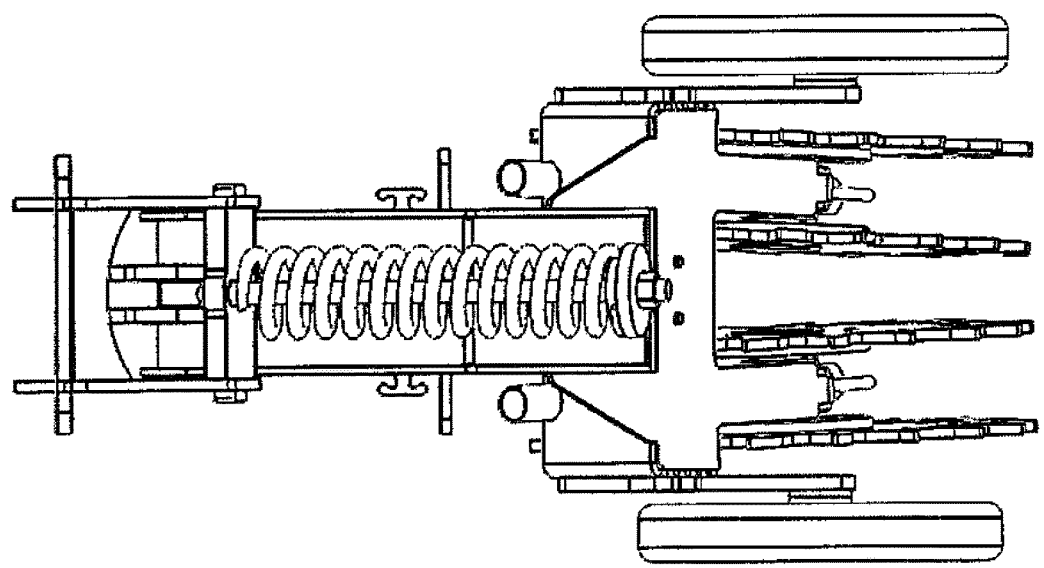
FIG. 10 is a top plan view thereof.

Third, the second embodiment contains a coil spring 130 as the shock absorber in place of the airbag in the first embodiment. The coil spring is more durable than the airbag. The coil spring is configured so that any upward movement of the frame compresses, and is resisted by, the coil spring. As best seen in FIG. 10, a rod passes through the coil spring. The proximate end of the rod is attached to the movable frame while the proximate end of the coil spring abuts the stationary toolbar bracket.

Fourth, the outward and inward arms of the second embodiment are connected directly to the transverse bracket 135 and the connecting rod is eliminated. And fifth, the spikes on the spike wheel 160 are slightly more curved, with a slightly concave leading edge and a slightly convex trailing edge, as can best be seen by comparing FIGS. 3 and 8. The curved spikes pierce the ground more effectively.

Figure 9:
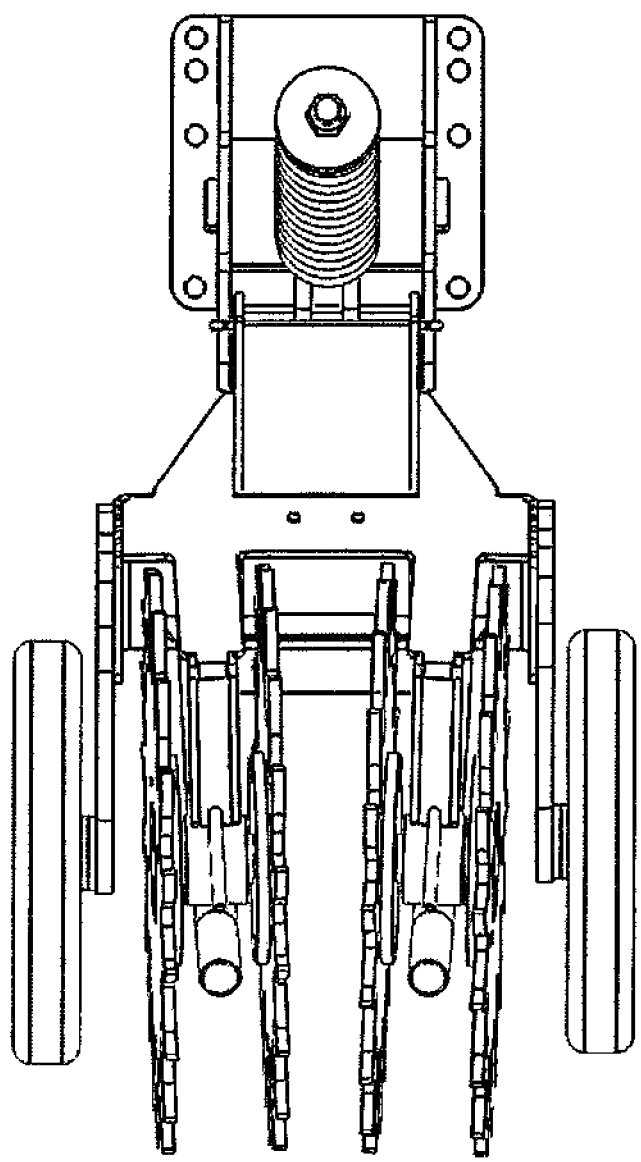
FIG. 9 is a rear elevation view thereof.

The use of the strip freshener row implement can now be considered. The desired number of implements are attached to the toolbar at the desired spacing. As the implements pass through the field, the top of the soil is broken up and formed into a low berm along the center of the strip. The independently rotating spike wheels enable the implement to effectively function even if one or two spike wheels are temporarily stopped from rotating by mud, rocks, or debris. The tubes attached to the housing between each pair of spike wheels, as best seen in FIGS. 9 and 10, provide a convenient means for applying fertilizer during freshening if desired.

I claim:

1. A strip freshener row implement for tilling a row in soil, the implement comprising:
    (a) a toolbar bracket for attachment to a toolbar pulled by a tractor;

(b) a frame having a forward proximate end and a rearward distal end, the frame extending rearwardly from its forward proximate end and forming a longitudinal axis overlying the row, the frame being pivotably connected at its forward proximate end to the toolbar bracket;

(c) a shock absorber contacting the toolbar bracket and the frame to exert a downward force on the frame and to absorb upward movement of the frame;

(d) a horizontal bracket transverse to the longitudinal axis of the frame connected to the rearward distal end of the frame;

(e) two descending outward arms having upper proximate ends and lower distal ends, the outward arms connected at their upper proximate ends to the horizontal bracket and having spindles at their lower distal ends;

(f) a depth wheel freely rotating on each of the spindles of the outward arms;

(g) two descending inward arms having upper proximate ends and lower distal ends, the inward arms connected at their upper proximate ends to the horizontal bracket and having an outwardly facing spindle and an inwardly facing spindle at their lower distal ends; and (h) a spiked disk freely rotating on each spindle of each inward arm.

2. The row implement of claim 1 wherein the shock absorber comprises a coil spring or an airbag.

3. The row implement of claim 1 wherein the spike wheels on each inward arm have a positive camber and a negative toe.

4. The row implement of claim 1 wherein the spindles on the outward arms face outwardly.

5. The row implement of claim 1 wherein the spindles on each inward arm are on a common axle so that the spiked disks on the spindles rotate together.

6. A strip freshener row implement for tilling a row in soil, the implement comprising:

(a) a toolbar bracket for attachment to a toolbar pulled by a tractor;

(b) a frame having a forward proximate end and a rearward distal end, the frame extending rearwardly from its forward proximate end and forming a longitudinal axis overlying the row, the frame being pivotably connected at its forward proximate end to the toolbar bracket;

(c) a shock absorber contacting the toolbar bracket and the frame to exert a downward force on the horizontal frame and to absorb upward movement of the horizontal frame;

(d) two descending outward arms having upper proximate ends and lower distal ends, the outward arms connected at their upper proximate ends to the horizontal bracket and having spindles at their lower distal ends;

(e) a depth wheel freely rotating on each of the spindles of the outward arms;

(f) a descending inward arm having an upper proximate end and a lower distal end, the inward arm connected at its upper proximate end to the rearward distal end of the frame and having an outwardly facing spindle and an inwardly facing spindle at its lower distal end; and (g) a spiked disk attached to each spindle of the inward arm.

7. The row implement of claim 6 wherein the shock absorber comprises a coil spring or an airbag.

8. The row implement of claim 7 wherein the spike wheels have spikes with a concave leading edge and a convex trailing edge.

9. The row implement of claim 8 comprising two descending inward arms.

10. The row implement of claim 9 wherein the spike wheels on each inward arm have a positive camber and a negative toe.

* * * * *